United States Patent
Lyakas et al.

(10) Patent No.: US 10,884,868 B2
(45) Date of Patent: Jan. 5, 2021

(54) DEDUPE AS AN INFRASTRUCTURE TO AVOID DATA MOVEMENT FOR SNAPSHOT COPY-ON-WRITES

(71) Applicant: Zadara Storage, Inc., Irvine, CA (US)

(72) Inventors: Alex Lyakas, Haifa (IL); Shyam Kaushik V., Bangalore (IN)

(73) Assignee: Zadara Storage, Inc., Irvine, CA (US)

( * ) Notice: Subject to any disclaimer, the term of this patent is extended or adjusted under 35 U.S.C. 154(b) by 152 days.

(21) Appl. No.: 15/726,205

(22) Filed: Oct. 5, 2017

(65) Prior Publication Data

US 2019/0108100 A1    Apr. 11, 2019

(51) Int. Cl.
*G06F 16/174* (2019.01)
*G06F 11/14* (2006.01)
*G06F 3/06* (2006.01)

(52) U.S. Cl.
CPC .......... *G06F 11/1453* (2013.01); *G06F 3/065* (2013.01); *G06F 3/0613* (2013.01); *G06F 3/0641* (2013.01); *G06F 3/0674* (2013.01); *G06F 11/1458* (2013.01); *G06F 16/1752* (2019.01); *G06F 3/0652* (2013.01); *G06F 2201/84* (2013.01)

(58) Field of Classification Search
CPC .. G06F 11/1453; G06F 3/0613; G06F 3/0674; G06F 3/065; G06F 16/1752; G06F 3/0641; G06F 11/1458; G06F 3/0652; G06F 2201/84
See application file for complete search history.

(56) References Cited

U.S. PATENT DOCUMENTS

| | | | | |
|---|---|---|---|---|
| 8,612,702 B1* | 12/2013 | Krishnan | ............... | G06F 3/0608 707/646 |
| 9,405,709 B1* | 8/2016 | Salpekar | ................. | G06F 11/00 |
| 9,792,075 B1* | 10/2017 | Banerjee | ............... | G06F 3/0667 |
| 2012/0017060 A1 | 1/2012 | Kapanipathi et al. | | |
| 2012/0124105 A1 | 5/2012 | Provenzano | | |
| 2012/0221817 A1* | 8/2012 | Yueh | ..................... | G06F 3/0608 711/162 |
| 2012/0331247 A1* | 12/2012 | Hoobler, III | ........ | G06F 11/1458 711/162 |
| 2014/0040205 A1* | 2/2014 | Cometto | ............... | G06F 3/0685 707/639 |
| 2014/0122434 A1* | 5/2014 | Knight | .................. | G06F 3/0608 707/645 |
| 2014/0280356 A1* | 9/2014 | Danilak | .................. | G06F 12/10 707/796 |
| 2015/0234710 A1* | 8/2015 | Berrington | .......... | G06F 11/1407 707/664 |

(Continued)

OTHER PUBLICATIONS

PCT/US18/52548, "International Search Report and Written Opinion," dated Jan. 29, 2019, 8 pages.

*Primary Examiner* — Alicia M Willoughby

(57) ABSTRACT

A method for a storage system reduces data movement for snapshot copy-on-write operations. The method includes providing a live volume having snapshot chunks. Each snapshot chunk includes a number of deduplication chunks. Each deduplication chunk is mapped to a disk chunk on a disk. The method includes creating a snapshot of the live volume and, for each host write to a snapshot chunk of the live volume that shares a set of disk chunks with a snapshot, performing a snapshot copy-on-write operation by a using a deduplication operation.

9 Claims, 3 Drawing Sheets

(56) References Cited

U.S. PATENT DOCUMENTS

| | | | |
|---|---|---|---|
| 2015/0234715 A1* | 8/2015 | Knight | G06F 11/1458 707/646 |
| 2016/0077926 A1* | 3/2016 | Mutalik | G06F 11/1453 711/162 |

* cited by examiner

US 10,884,868 B2

DEDUPE AS AN INFRASTRUCTURE TO AVOID DATA MOVEMENT FOR SNAPSHOT COPY-ON-WRITES

FIELD OF INVENTION

This invention relates to snapshots and copy-on-write, and more particularly to reducing data movement for a snapshot copy-on-writes by placing a deduplication layer below a snapshot layer.

DESCRIPTION OF RELATED ART

Most storage system's snapshot implementation share chunks of data between a volume and its snapshot. Different storage systems maintain this sharing at different granularity. For example, 256 kilobytes (KB) or 1 megabyte (MB) chunk granularities are shared between a volume and its snapshots.

When a shared chunk is being overwritten by an incoming host write (e.g., 8 KB write), most storage systems perform a copy-on-write (COW) operation that copies the chunk granularity (e.g., 256 KB or 1 MB) buffer to another location and then apply the incoming write onto this buffer. This operation involves reading chunk granularity data and writing into another location, which is input/output (I/O) intensive.

A deduplication system identifies repeated buffer patterns by computing a fingerprint (e.g., a hash) of the buffer. When a repeated buffer of the exact pattern is written, deduplication increments reference count of the shared buffer and sets up a data pointer to point to a shared data location.

SUMMARY

In one or more examples of the present disclosure, a storage system uses higher granularity for snapshot tracking (e.g., 256 KB/1 MB/2 MB/4 MB) and lower granularity for deduplication (e.g., 8 KB/16K). The system has a deduplication layer below a snapshot layer in order to avoid snapshot copy-on-write (COW) data movements. The snapshot COW operation will instead increment deduplication reference count on all of the deduplication chunks corresponding to the shared buffer and then allow the incoming host write. Thus, the snapshot COW operation essentially becomes an increment of a deduplication reference count on the underlying deduplication chunks that are to be retained and avoids any data read and write operations for those chunks. The snapshot COW operation becomes very lightweight and therefore it is possible to have snapshot granularity at higher sizes, such as 4 MB.

BRIEF DESCRIPTION OF THE DRAWINGS

Use of the same reference numbers in different figures indicates similar or identical elements.

DETAILED DESCRIPTION OF THE INVENTION

Figure 1:
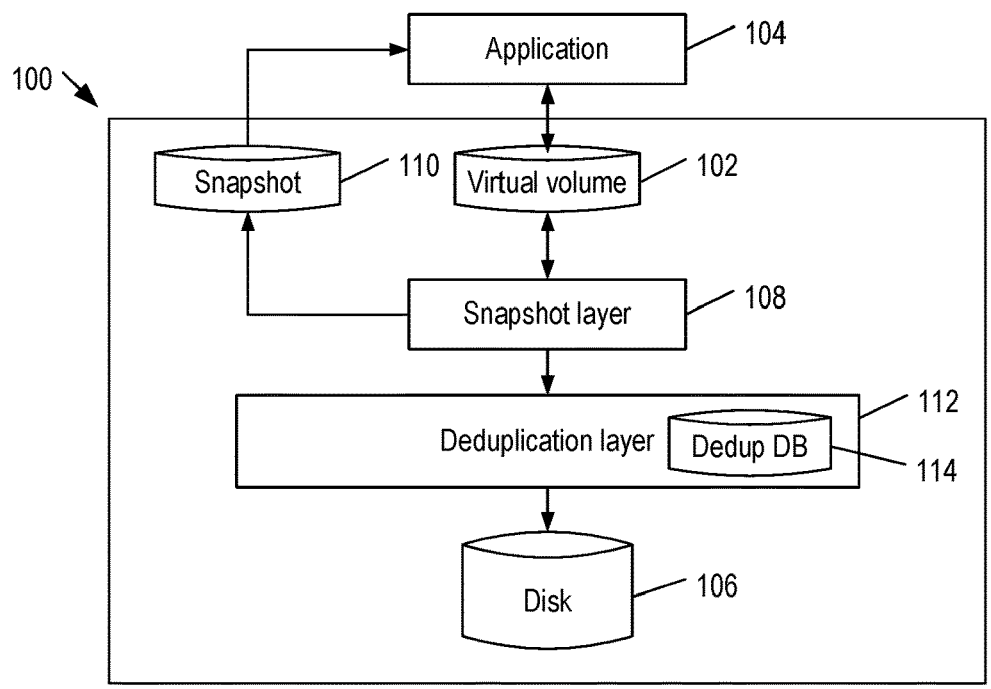
FIG. 1 is a storage system in some examples of the present disclosure.

FIG. 1 is a block diagram of a data storage system 100 in some examples of the present disclosure. System 100 exposes a virtual volume 102 that may be accessed (e.g., read and written) by an application 104 on another system. When system 100 receives a write operation to virtual volume 102, it consults a mapping for virtual volume 102 and routes the write to the correct physical location on disk 106. When system 100 receives a read operation to virtual volume 102, it consults the virtual volume mapping and reads data from the correct physical location on disk 106.

System 100 includes a snapshot layer 108 that logically divides virtual volume 102 into snapshot chunks and maps them to disk locations. A snapshot chunk is the logical unit in which snapshot layer 108 performs copy-on-write (COW) operations when virtual volume 102 is modified. For example, a snapshot chunk may be 256 KB, 1 MB, 2 MB, or 4 MB. To track the snapshot chunks, snapshot layer 108 maintains a collection of keys and values where a key identifies a snapshot chunk (e.g., a snapshot chunk index) and a corresponding value identifies a disk location (e.g., a logical block address on disk) of the snapshot chunk. The mapping of keys and values may be implemented as a B-tree (e.g., a B+ tree). As described later, when there is a deduplication layer 112 below snapshot layer 108, the value is actually an abstract identifier that is a key to another mapping of a snapshot chunk to deduplication chunks on a physical storage, such as physical disk 106.

Snapshot layer 108 creates a snapshot 110 of virtual volume 102 that captures the data of virtual volume 102 at a point in time. Snapshot 110 may be implemented in a number of ways. Snapshot 110 may be a read-only clone of the mapping (B-tree) for virtual volume 102 while the mapping for virtual volume 102 remains writable (live). Cloning would not require the copying of the whole mapping for virtual volume 102. Only the root of the B-tree is copied to form the root of the cloned B-tree. A reference count is tracked for each B-tree block and the B-tree is modified by shadowing any shared block having a reference count higher than one (1). For details regarding cloning and shadowing, please refer to Rode, Ohad, "B-trees, Shadowing and Clones," ACM Transactions on Storage (TOS), vol. 3, issue 4, February 2008. Alternatively, snapshot 110 may be a read-only copy of the mapping (B-tree) for virtual volume 102 while the mapping for virtual volume 102 remains writable (live). Either way, snapshot 110 has snapshot chunks that initially share underlying disk locations with the snapshot chunks of virtual volume 102 so the underlying data of virtual volume 102 in disk 106 are not copied.

System 100 includes a deduplication layer 112 with a deduplication database (DB) 114 below snapshot layer 108. Deduplication layer 112 logically divides each snapshot chunk of virtual volume 102 into deduplication chunks and maps the deduplication chunks to disk chunks on disk 106. A deduplication chunk is the logical unit in which deduplication layer 112 compares data for duplication. For example, a deduplication chunk may be 4 KB, 8 KB, or 16 KB. Deduplication layer 112 detects identical data patterns being written to different deduplication chunks and maps them to the same disk chunk on disk 106.

To determine if a data pattern in a deduplication chunk is unique, deduplication layer 112 generates a fingerprint for the data pattern and compares it to existing fingerprints for known data patterns stored in deduplication DB 114. The fingerprint may be a hash function value of the data pattern. When the fingerprint matches an existing fingerprint, deduplication layer 112 maps the deduplication chunk to an existing disk chunk in disk 106 and increments a reference count for the corresponding data pattern in deduplication DB 114. When the fingerprint does not match any existing fingerprint, deduplication layer 112 allocates a new disk chunk in disk 106, write the new data pattern to the new disk chunk in disk 106, and maps the deduplication chunk to the new disk chunk in disk 106. Deduplication layer 112 also adds the new fingerprint to deduplication DB 114 with a reference count of 1, and decrements a reference count of any known data pattern in deduplication DB 114 that is being written over in virtual volume 102.

Figure 2:
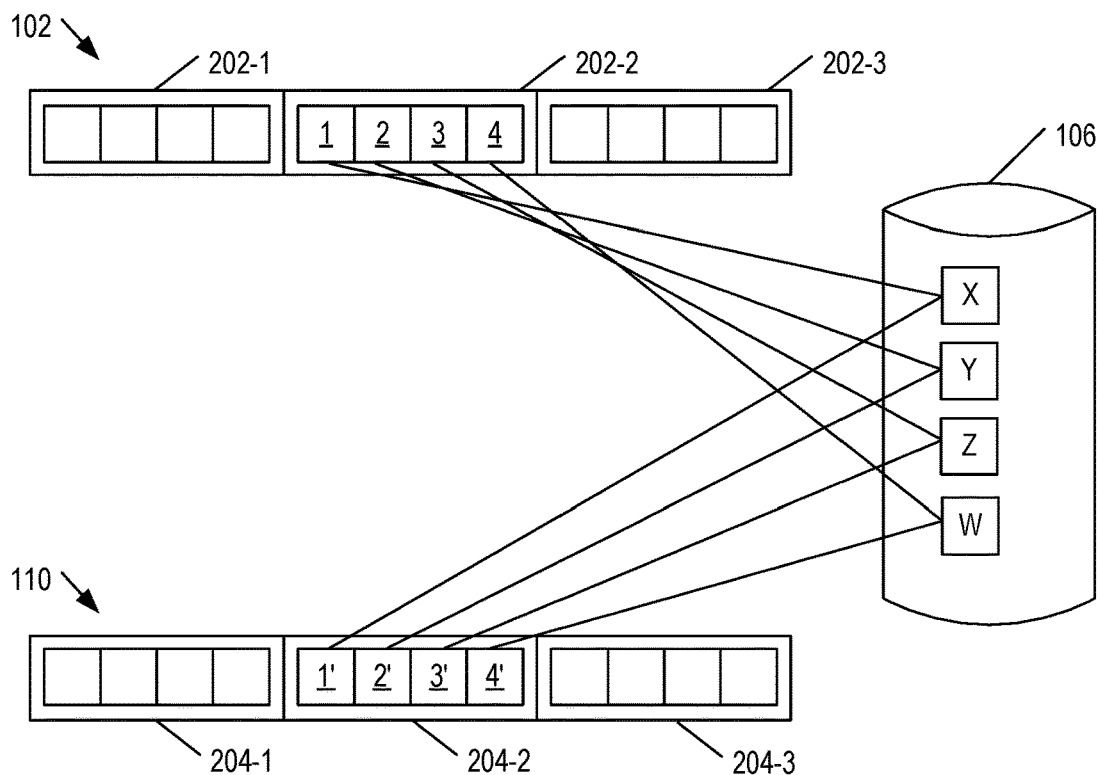
FIGS. 2, 3, and 4 are block diagrams illustrating a virtual volume and its snapshot in some examples of the present disclosure.

FIG. 2 is a block diagram illustrating virtual volume 102 and snapshot 110 of virtual volume 102 in some examples of the present disclosure. As described above, snapshot layer 108 divides virtual volume 102 into snapshot chunks. For illustrative purposes, virtual volume 102 is divided into snapshot chunks 202-1, 202-2, and 202-3. As described above, deduplication layer 112 divides each snapshot chunk into deduplication chunks and maps each deduplication chunk to a disk chunk on disk 106. For illustrative purposes, snapshot chunk 202-2 is divided into deduplication chunks 1, 2, 3, and 4 mapped respectively to disk chunks having data patterns X, Y, Z, and W on disk 106. As described above, snapshot layer 108 creates a snapshot 110 of virtual volume 102 without copying any of the underlying data of virtual volume 102 in disk 106. For example, snapshot layer 108 makes a read-only copy of the mapping for virtual volume 102. For illustrative purposes, snapshot 110 is divided into snapshot chunks 204-1, 204-2, and 204-3, which correspond to snapshot chunks 202-1, 202-2, and 202-3 of virtual volume 102. For illustrative purposes, snapshot chunk 204-2 is divided into deduplication chunks 1', 2', 3', and 4' mapped respectively to disk chunks having data patterns X, Y, Z, and W on disk 106, which are shared with deduplication chunks 1, 2, 3, and 4 of snapshot chunk 202-2.

Referring back to FIG. 1, when application 104 wishes to rewrite a part of a snapshot chunk of virtual volume 102, snapshot layer 108 determines if the underlying physical location on disk 106 is shared between the snapshot chunk of virtual volume 102 and a snapshot chunk of snapshot 110. For example, snapshot layer 108 determines if the rewrite is a first write to the snapshot chunk since snapshot 110 was created. If so, snapshot layer 108 performs a snapshot copy-on-write (COW) operation.

In a typical COW operation, a conventional snapshot layer would allocate a new physical location in disk 106 for a snapshot chunk of virtual volume 102, read the current (old) data from the current (old) physical location in disk 106 for the snapshot chunk of virtual volume 102, update the old data with the new data, write the updated data to the new physical location in disk 106, and update the mapping for virtual volume 102. This would require the data of the entire snapshot chunk to be read, updated, and then written even when only a small part of the snapshot chunk is rewritten. In examples of the present disclosure, snapshot layer 108 employs deduplication layer 112 to perform the snapshot COW operation.

Figure 3:
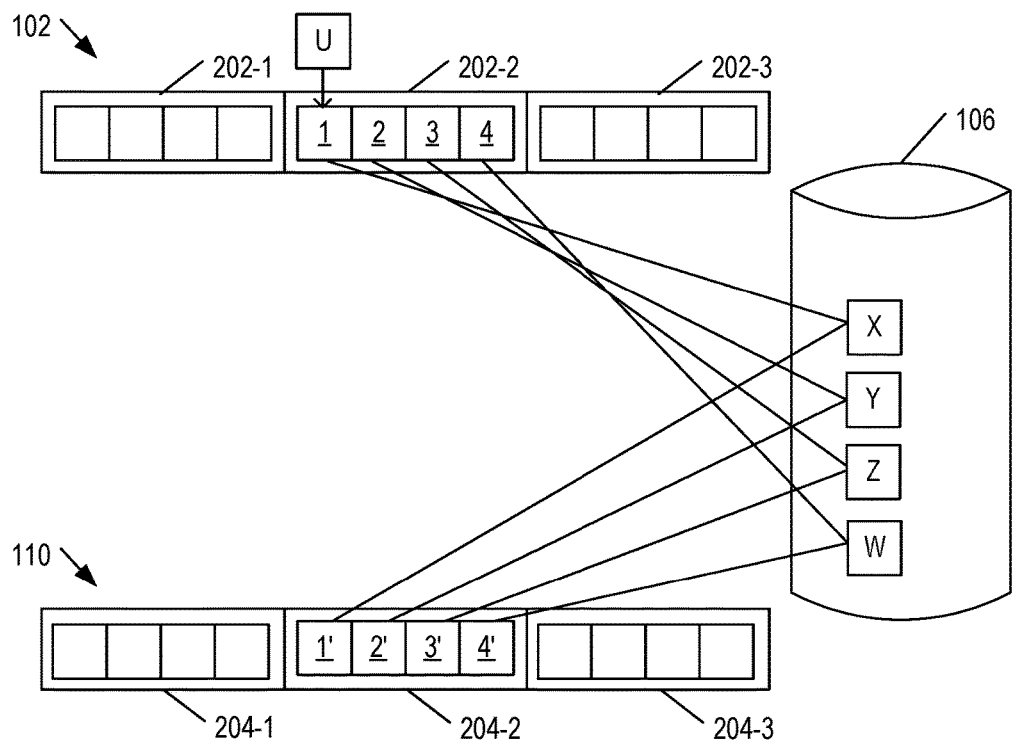

Referring to FIG. 3, application 104 (FIG. 1) partly rewrites snapshot chunk 202-2 of virtual volume 102. For example, application 104 writes a new data pattern U over data pattern X in deduplication chunk 1 of snapshot chunk 202-2. Instead of performing a snapshot COW operation on the entire snapshot chunk 202-2, snapshot layer 108 uses deduplication layer 112 to perform the snapshot COW operation only on the deduplication chunk 1 being rewritten.

Figure 4:
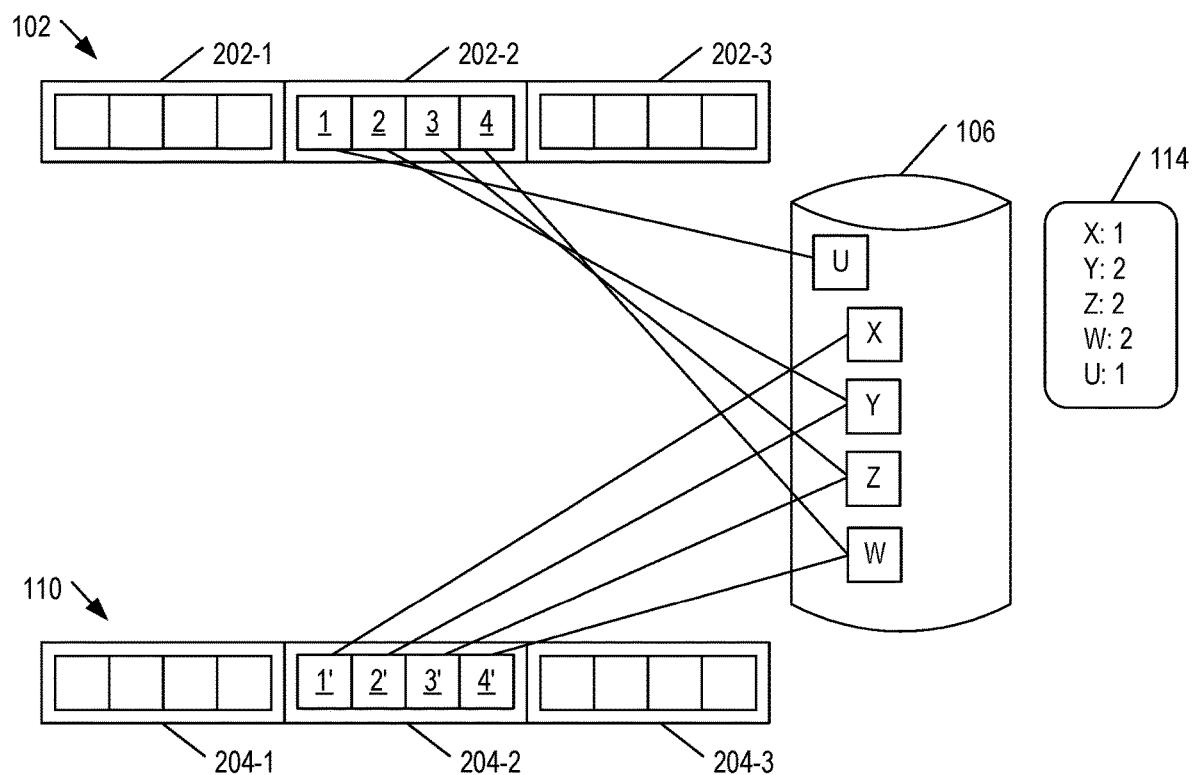

Deduplication layer 112 determines if data pattern U is unique. To determine if a deduplication chunk is unique, deduplication layer 112 generates a fingerprint for data pattern U and compares it to the existing fingerprints for known data patterns in deduplication DB 114. As illustrated in FIG. 4, when the fingerprint does not match any existing fingerprint, deduplication layer 112 allocates a new disk chunk in disk 106, writes data pattern U to the new disk chunk in disk 106, and maps deduplication chunk 1 of snapshot chunk 202-2 in virtual volume 102 to the new disk chunk with data pattern U. Note deduplication chunk 1' of snapshot chunk 204-2 in snapshot 110 still points to the old disk chunk having data pattern X. Deduplication layer 112 also adds the new fingerprint to deduplication DB 114 with a reference count of 1, and decrements the reference count of data pattern X being written over. When the fingerprint matches an existing fingerprint, deduplication layer 112 maps deduplication chunk 1 of snapshot chunk 202-2 in virtual volume 102 to an existing disk chunk in disk 106 and increments the reference count for the corresponding data pattern in deduplication DB 114.

As described, the snapshot COW operation becomes a deduplication reference count increment on the underlying deduplication chunks that are to be retained and avoids any data read and write operations for those chunks. With the snapshot COW becoming light-weight, it is possible to have snapshot granularity at higher sizes such as 4 MB.

Figure 5:
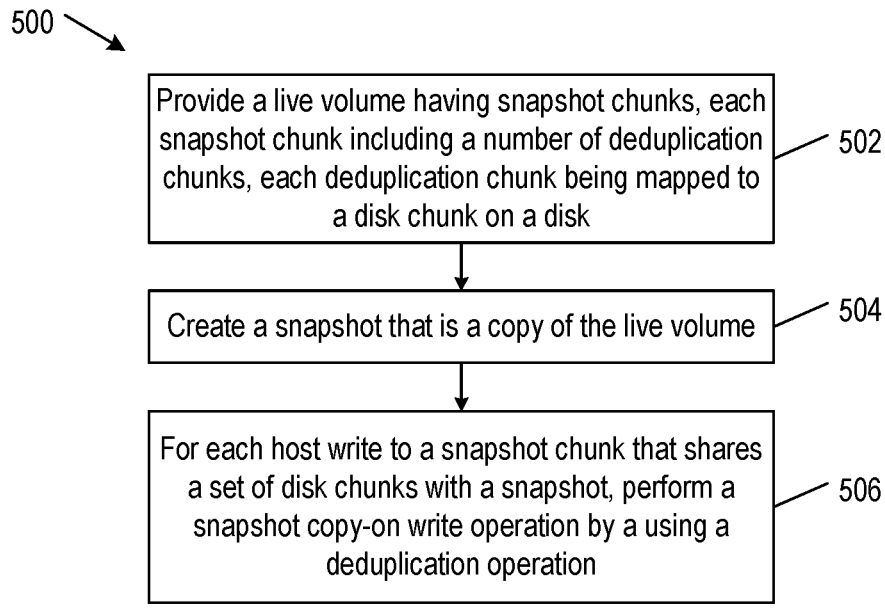
FIG. 5 is a flowchart of a method for the storage system of FIG. 1 to reduce data movement for snapshot copy-on writes in some examples of the present disclosure.

FIG. 5 is a flowchart of a method 500 for storage system 100 to reduce data movement for snapshot COW operations in some examples of the present disclosure. Method 500 may be implemented as instructions encoded on a computer-readable medium that is to be executed by a processors in a computer system. Method 500 may include one or more operations, functions, or actions illustrated by one or more blocks. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation. Method 500 may begin in block 502.

In block 502, storage system 100 provides a live volume (e.g., virtual volume 102 in FIG. 1) including snapshot chunks. Each snapshot chunk includes multiple deduplication chunks, and each deduplication chunk is mapped to a disk chunk on disk 106 (e.g., snapshot chunk 202-2 is mapped to disk chunks having data patterns X, Y, Z, and W in FIG. 2). Block 502 may be followed by block 504.

In block 504, storage system 100 (more specifically snapshot layer 108) creates a snapshot that is a copy of the live volume (e.g., snapshot 110 in FIG. 2). Block 504 may be followed by block 506.

In block 506, for each host write to a snapshot chunk of the live volume that shares a set of disk chunks with a snapshot, storage system 100 (more specifically snapshot layer 108 and deduplication layer 112) performs a snapshot copy-on write operation by a using a deduplication operation.

Figure 6:
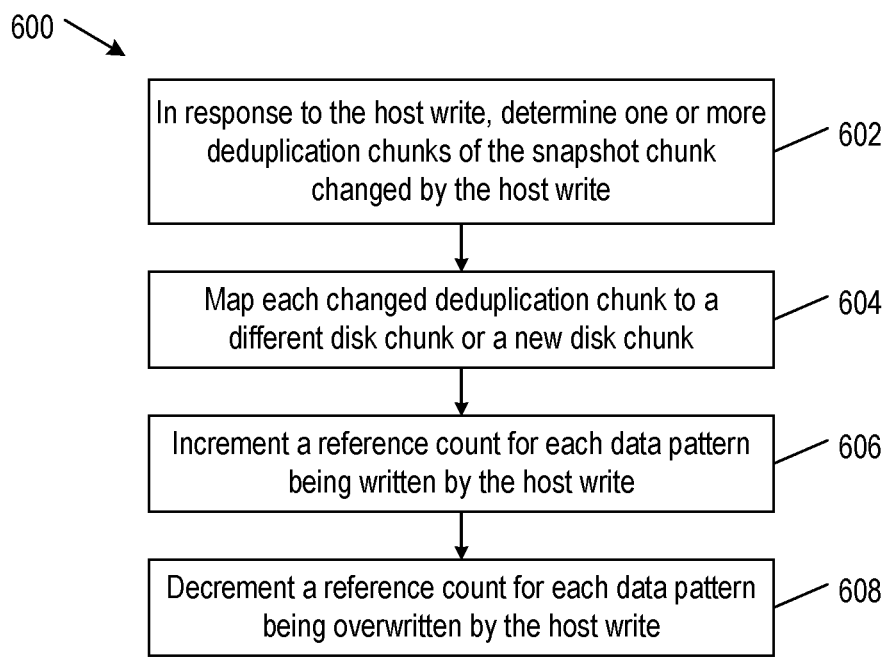
FIG. 6 is a flowchart of a method for the storage system of FIG. 1 to perform a snapshot copy-on-write by a using a deduplication operation in some examples of the present disclosure.

FIG. 6 is a flowchart of a method 600 for storage system 100 to perform block 506 (FIG. 5) in some examples of the present disclosure. Method 600 may begin in block 602.

In block 602, in response to a host write, storage system 100 (more specifically deduplication layer 112) determines one or more deduplication chunk of a snapshot chunk of a live volume are changed by the host write (e.g., deduplication chunk 1 of snapshot chunk 202-2 in virtual volume 102 in FIG. 3). Block 602 may be followed by block 604.

In block 604, storage system 100 (more specifically deduplication layer 112) maps each changed deduplication chunk to a different disk chunk or a new disk chunk. A changed deduplication chunk is mapped to a different disk chunk if its data pattern matches an existing pattern in deduplication DB 114. A changed deduplication chunk is mapped to a new disk chunk if its data pattern is new and therefore does not match any existing pattern in deduplication DB 114. Block 604 may be followed by block 606.

In block 606, storage system 100 (more specifically deduplication layer 112) increments the reference count for each data pattern being written by the host write. Block 606 may be followed by block 608.

In block 608, storage system 100 (more specifically deduplication layer 112) decrements the reference count for each data pattern being overwritten by the host write.

Various other adaptations and combinations of features of the embodiments disclosed are within the scope of the invention. Numerous embodiments are encompassed by the following claims.

The invention claimed is:

1. A method for a storage system to reduce data movement for snapshot copy-on-write operations, comprising:
   providing a live virtual volume comprising a plurality of snapshot chunks, each snapshot chunk of said plurality of snapshot chunks comprising a plurality of deduplication chunks, wherein each one of said plurality of deduplication chunks is mapped to a disk chunk on a disk;
   creating a snapshot of the virtual live volume without copying any of the live volume's underlying data in the disk, by mapping each of a plurality of deduplication chunks of each of a plurality of snapshot chunks composing said snapshot, to a respective disk chunk on said disk; and
   in response to a host write operation to a snapshot chunk of the virtual live volume that includes a set of deduplication chunks mapped to disk chunks also mapped from a snapshot, performing a snapshot copy-on-write operation using a deduplication operation by:
      determining for each deduplication chunk of the snapshot chunk being written by said host write operation to the virtual live volume, when data is changed in a certain deduplication chunk;
      mapping the changed deduplication chunk of the snapshot chunk of the virtual live volume to a different disk chunk or to a new disk chunk;
   wherein a disk chunk mapped from said certain deduplication chunk of said snapshot chunk of said virtual live volume before said host write operation and mapped from said snapshot, is kept mapped from said snapshot after said host write operation.

2. The method of claim 1, wherein the deduplication operation further comprises incrementing a reference count for a data pattern being written by the host write.

3. The method of claim 2, wherein the deduplication operation further comprises decrementing a reference count for a data pattern being overwritten by the host write.

4. A storage system, comprising:
   a processor executing a snapshot layer and a deduplication layer below the snapshot layer,
   the snapshot layer being configured to:
      create a snapshot of a live virtual volume without copying any of the live virtual volume's underlying data in a disk, the live virtual volume comprising snapshot chunks mapped to disk locations on the disk; and
      perform a snapshot copy-on-write operation for each host write to a snapshot chunk of the live virtual volume that includes a set of deduplication chunks mapped to disk chunks also mapped from a snapshot;
   the deduplication layer being configured to:
      divide each snapshot chunk into a plurality of deduplication chunks, each of said plurality of deduplication chunks is mapped to disk chunk on the disk; and
      perform a deduplication operation for each snapshot copy-on write operation by:
         determining for each deduplication chunk of the snapshot chunk being written by said host write operation to the live virtual volume, when data is changed in a certain deduplication chunk;
         mapping the changed deduplication chunk of the snapshot chunk of the live virtual volume to a different disk chunk or to a new disk chunk;
      wherein a disk chunk mapped from said certain deduplication chunk of said snapshot chunk of said live virtual volume before said host write operation and mapped from said snapshot, is kept mapped from said snapshot after said host write operation.

5. The system of claim 4, wherein the deduplication operation further comprises incrementing a reference count for a data pattern being written by the host write.

6. The system of claim 5, wherein the deduplication operation further comprises decrementing a reference count for a data pattern being overwritten by the host write.

7. A non-transitory, computer-readable storage medium encoded with instructions executable by a processor to implement a storage system to reduce data movement for snapshot copy-on-write operations, the instructions comprising:
   provide a live virtual volume comprising a plurality of snapshot chunks, each snapshot chunk of said plurality of snapshot chunks comprising a plurality of deduplication chunks, wherein each one of said plurality of deduplication chunks is mapped to a disk chunk on a disk;
   create a snapshot of the live virtual volume without copying any of the live volume's underlying data in the disk, by mapping each of a plurality of deduplication chunks of each of a plurality of snapshot chunks composing said snapshot, to a respective disk chunk on said disk; and
   in response to a host write operation to a snapshot chunk of the live virtual volume that includes a set of deduplication chunks mapped to disk chunks also mapped from a snapshot, perform a snapshot copy-on-write operation using a deduplication operation by;
      determining for each deduplication chunk of the snapshot chunk being written by said host write operation to the virtual live volume, when data is changed in a certain deduplication chunk;
      mapping the changed deduplication chunk of the snapshot chunk of the virtual live volume to a different disk chunk or to a new disk chunk;
   wherein a disk chunk mapped from said certain deduplication chunk of said snapshot chunk of said virtual live volume before said host write operation and mapped from said snapshot, is kept mapped from said snapshot after said host write operation.

8. The storage medium of claim 7, wherein the deduplication operation further comprises incrementing a reference count for a data pattern being written by the host write.

9. The storage medium of claim 8, wherein the deduplication operation further comprises decrementing a reference count for a data pattern being overwritten by the host write.

* * * * *